United States Patent
Krause

(10) Patent No.: US 7,967,710 B2
(45) Date of Patent: Jun. 28, 2011

(54) LINK-PLATE CHAIN FOR A V-PULLEY CONTINUOUSLY VARIABLE TRANSMISSION

(75) Inventor: Matthias Krause, Buxheim (DE)

(73) Assignee: Audi, AG, Ingolstadt (DE)

(*) Notice: Subject to any disclaimer, the term of this patent is extended or adjusted under 35 U.S.C. 154(b) by 403 days.

(21) Appl. No.: 11/434,753

(22) Filed: May 17, 2006

(65) Prior Publication Data

US 2006/0270504 A1    Nov. 30, 2006

(30) Foreign Application Priority Data

May 18, 2005 (DE) .......................... 10 2005 022 758

(51) Int. Cl.
*F16G 13/02* (2006.01)
*F16G 13/06* (2006.01)
(52) U.S. Cl. ........................................ 474/206; 474/215
(58) Field of Classification Search .................. 474/206, 474/215, 204
See application file for complete search history.

(56) References Cited

U.S. PATENT DOCUMENTS

| | | | | |
|---|---|---|---|---|
| 2,036,216 A * | 4/1936 | Johnson | ......................... | 474/215 |
| 2,067,243 A * | 1/1937 | Perry | ........................... | 474/215 |
| 2,324,640 A * | 7/1943 | Perry | ........................... | 474/215 |
| 4,655,733 A * | 4/1987 | Jonason | ........................... | 474/242 |
| 4,911,682 A * | 3/1990 | Ivey et al. | ......................... | 474/245 |
| 5,026,331 A * | 6/1991 | Sugimoto et al. | ............. | 474/214 |
| 2003/0036450 A1* | 2/2003 | Linnenbrugger et al. | .... | 474/201 |

FOREIGN PATENT DOCUMENTS

| | | |
|---|---|---|
| DE | 100 52 473 | 10/2000 |
| EP | 0 452 994 A2 | 10/1988 |
| JP | 2002316164 | 10/2002 |
| JP | 2004308675 A * | 11/2004 |

* cited by examiner

*Primary Examiner* — Michael R Mansen
*Assistant Examiner* — Robert T Reese
(74) *Attorney, Agent, or Firm* — Novak Druce + Quigg LLP

(57) ABSTRACT

The invention relates to a link-plate chain for a v-pulley-continuously variable transmission, especially for motor vehicles, with several cradle thrust pieces configured in pairs and projecting transversely through the link-plate chain, and links which are offset to each other and which connect the cradle thrust pieces in the lengthwise direction of the chain, the cradle thrust pieces adjoining each other with the inner rolling surfaces facing each other and interacting with outer rolling surfaces with openings of the links and on their front sides having friction surfaces which run onto the annular surfaces of the v-pulleys to transmit torque, and furthermore the cradle thrust pieces being made such that the differences of the torque transmitted by way of the cradle thrust piece pairs to the links, which differences are present over the width of the link-plate chain, are at least partially compensated. To obtain a link-plate chain with low wear and improved stability of running, the outer rolling surfaces of at least one of the respective cradle thrust pieces, but preferably of both cradle thrust pieces, are made such that the links of the link-plate chain which lie outside when viewed in the transverse direction are relieved at low load and at full load are loaded at the same time in the elastic deformation region of the cradle thrust pieces.

17 Claims, 3 Drawing Sheets

LINK-PLATE CHAIN FOR A V-PULLEY CONTINUOUSLY VARIABLE TRANSMISSION

This application claims priority from DE 10 2005 022 758.9, having been filed on May 18, 2005.

The invention relates to a link-plate chain for a v-pulley-continuously variable transmission, especially for motor vehicles.

A generic link-plate chain is described by DE 10 2004 012 400 A1 in which to prevent wear of at least the outside links it is suggested that the inner rolling surfaces of the cradle thrust pieces be made as free-form surfaces such that differences in the tension applied to the links, which differences present over the width of the link-plate chain, are compensated. Specifically the cradle thrust pieces relative to the width of the link-plate chain in the middle area on the adjoining rolling surfaces are made thicker than on the end areas. Thus, for wider link-plate chains the overloading of the outer links which occurs by the deflection of the cradle thrust pieces under high loads will be counteracted. In this way, for lower stress on the link-plate chain (for example, partial load operation) only spot contact between the cradle thrust pieces occurs which can cause a certain instability of the link-plate chain and increased wear.

The object of the invention is to develop a link-plate chain of the generic type with simple means such that for tension loading as uniform as possible less wear and quieter running of the link-plate chain are achieved.

As claimed in the invention, it is proposed that the outer rolling surfaces of at least one of the respective cradle thrust pieces—but preferably of the two cradle thrust pieces—are made such that the links of the link-plate chain which lie outside when viewed in the transverse direction are relieved at low load and at full load are loaded at the same time in the elastic deformation region of the cradle thrust pieces.

The cradle thrust pieces thus continually adjoin each other with their inner rolling surfaces as structurally intended and first of all jointly counteract deflection. This improves the stability of running and the wear behavior of the link-plate chain, based on the suggested configuration of the outer rolling surfaces of the cradle thrust pieces nevertheless the inner links being more highly loaded than the outer links. With increasing loading of the link-plate chain up to full load, the elastic deflection of the cradle thrust pieces also shifts the loading of the links to the external links, at least essentially uniform tension being applied. The configuration of the cradle thrust pieces is such that for example when the link-plate chain is stretched beforehand with a defined full load, the deflection of the cradle thrust pieces remains in the elastic range so that the described function is continuously maintained in operation of the link-plate chain.

Furthermore, it has been shown that the proposed configuration of the cradle thrust pieces with the correspondingly made outer rolling surfaces can achieve improved damping behavior of the link-plate chain by microslip between the adjacent links.

The cradle thrust pieces preferably adjoin each other at least with linear contact on their inner rolling surfaces over their width, while the outer rolling surfaces taper conically toward the front sides of the cradle thrust pieces. This results in stable, defined assignment of the cradle thrust pieces to each other over the entire load range of the link-plate chain.

The cradle thrust piece pairs can be made conical at least on their end areas connected to the front sides to achieve a defined tension distribution on the links, which is given over the load region of the link-plate chain, while viewed over the width of the link-plate chain the middle segment is made axially parallel. In this way an inner, middle link assembly with several links located next to each other is continuously loaded even at low load of the link-plate chain.

The cradle thrust piece pairs however can also advantageously be made conical from the chain middle to both sides viewed over the entire width of the link-plate chain, so that the tension applied to the links with increasing load passes uniformly to all links.

The external rolling surfaces of the cradle thrust pieces viewed over the width of the link-plate chain can be made favorably in terms of production engineering with at least one defined radius of curvature $r_2$ such that at low load only the middle links and at full load all links of the link-plate chain are stressed, the deformation of the cradle thrust pieces which results from the full load remaining in the elastic area.

In this connection preferably the curvature of the outer rolling surfaces of the cradle thrust pieces can be matched to the load on the link-plate chain such that in the full load area of the link-plate chain in the pulling direction and optionally in the pushing direction essentially a uniform, specific application of tension to the links of the link-plate chain is achieved.

For a basic layout of the outer rolling surfaces of the cradle thrust pieces which is convex, optionally rotationally symmetrical when viewed in cross section, they can be made crowned in the conically decreasing area in order to make the tension behavior in the cradle thrust pieces in conformity with loading.

Finally, the outer rolling surfaces can be made uniform and axially parallel over approximately one third of their middle lengthwise extension and on either side of their front surfaces, conically tapering. In this way, in addition to simplified production of the cradle thrust pieces, specific middle link assemblies can be incorporated into the lower load application, while the links which are outside viewed over the width of the link-plate chain are successively connected to the power transmission of the link-plate chain.

Several exemplary embodiments of the invention are detailed below with further details. The drawings are schematic.

Figure 1:
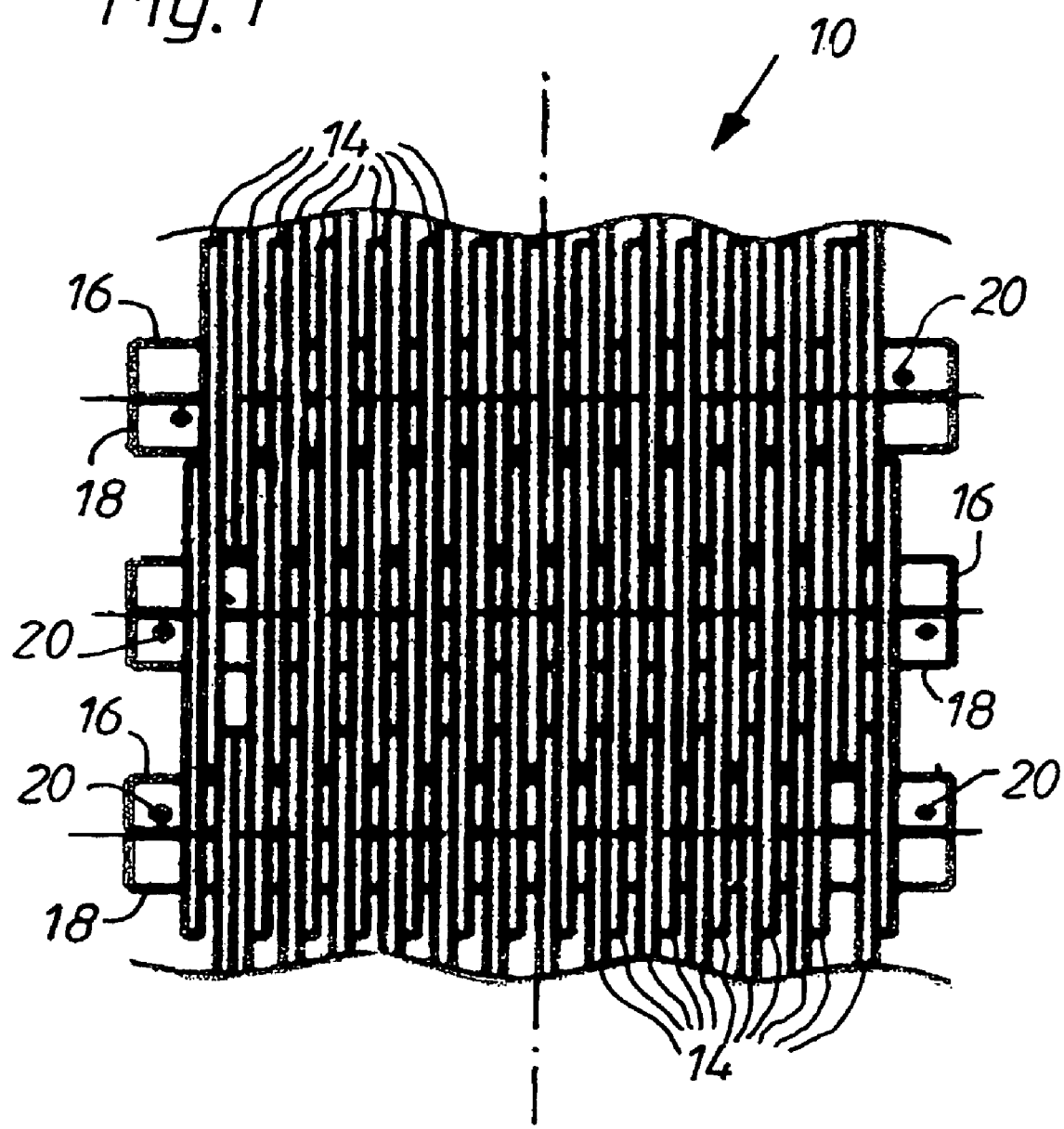
FIG. 1 shows a top view of one section of a link-plate chain for a v-pulley-continuously variable transmission for motor vehicles.
Figure 2:
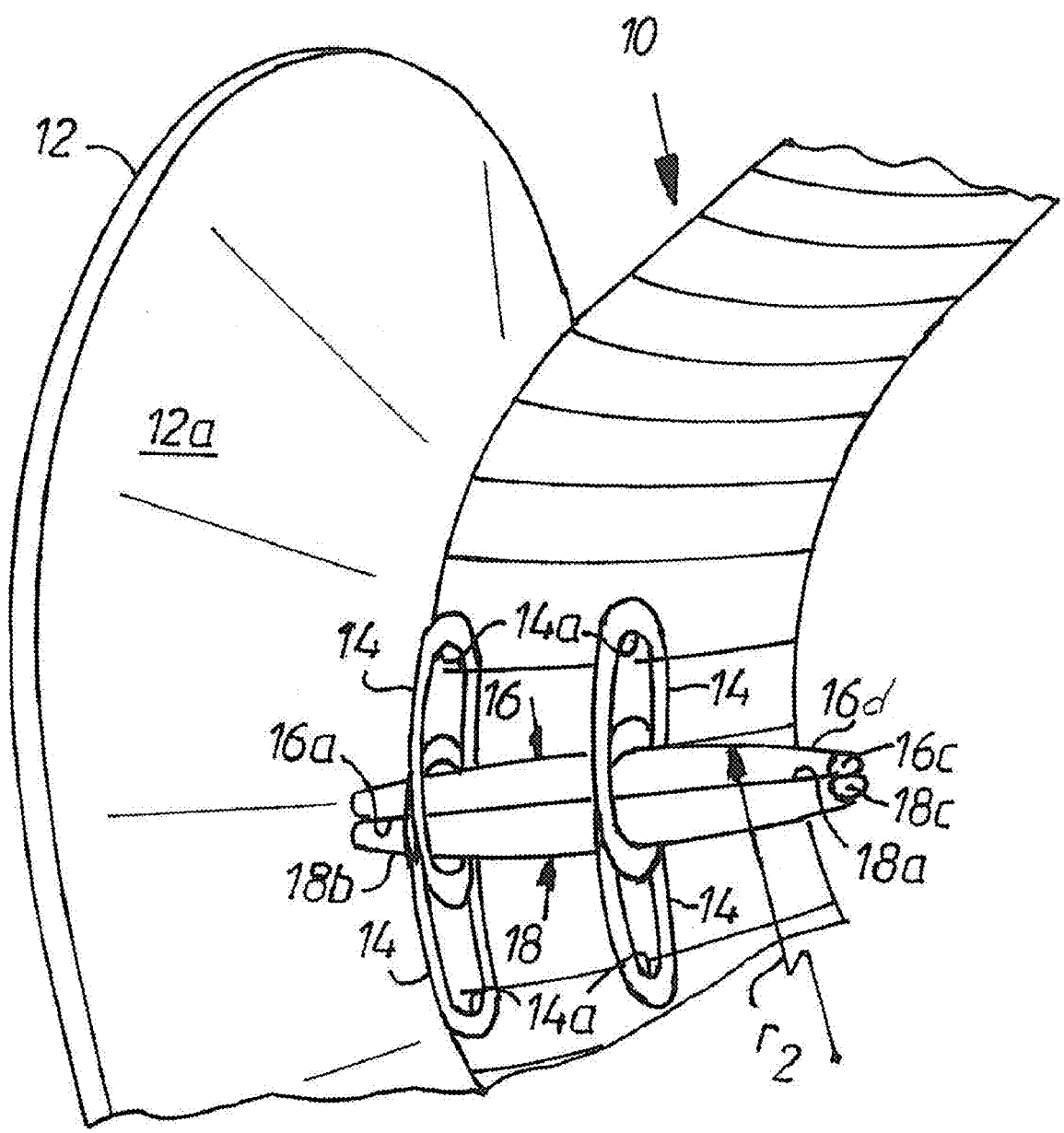
FIG. 2 shows a three-dimensional, rough schematic of an individual cradle thrust piece pair of the link-plate chain as shown in FIG. 1 with middle and outer links.

FIGS. 1 and 2 show in sections a link-plate chain 10 for a v-pulley-continuously variable transmission (CVT) for motor vehicles. The link-plate chain 10 (compare FIG. 2) runs peripherally in the conventional manner between two axially adjustable v-pulleys 12 of two v-pulley sets located on the gear shafts on the corresponding conical surfaces 12a (only one pulley half is shown), for continuous setting of the transmission ratio the effective chain looping radii being adjustable on the pulley sets in the conventional manner.

The link-plate chain 10 is composed essentially of a plurality of links located next to and following each other (generally designated as 14), in the openings 14a of which cradle thrust piece pairs 16, 18 project which are spaced apart from each other in the lengthwise direction of the chain and which are aligned transversely to the link-plate chain 10. A continuous chain combination with links 14 which interact in alternation with the cradle thrust pieces 16, 18 is formed by the offset of the links 14 in the lengthwise direction of the chain.

The cradle thrust piece pairs 16, 18 and the links 14 are locked in the axial direction by weld pins 20 which are only suggested (FIG. 1).

Figure 3:
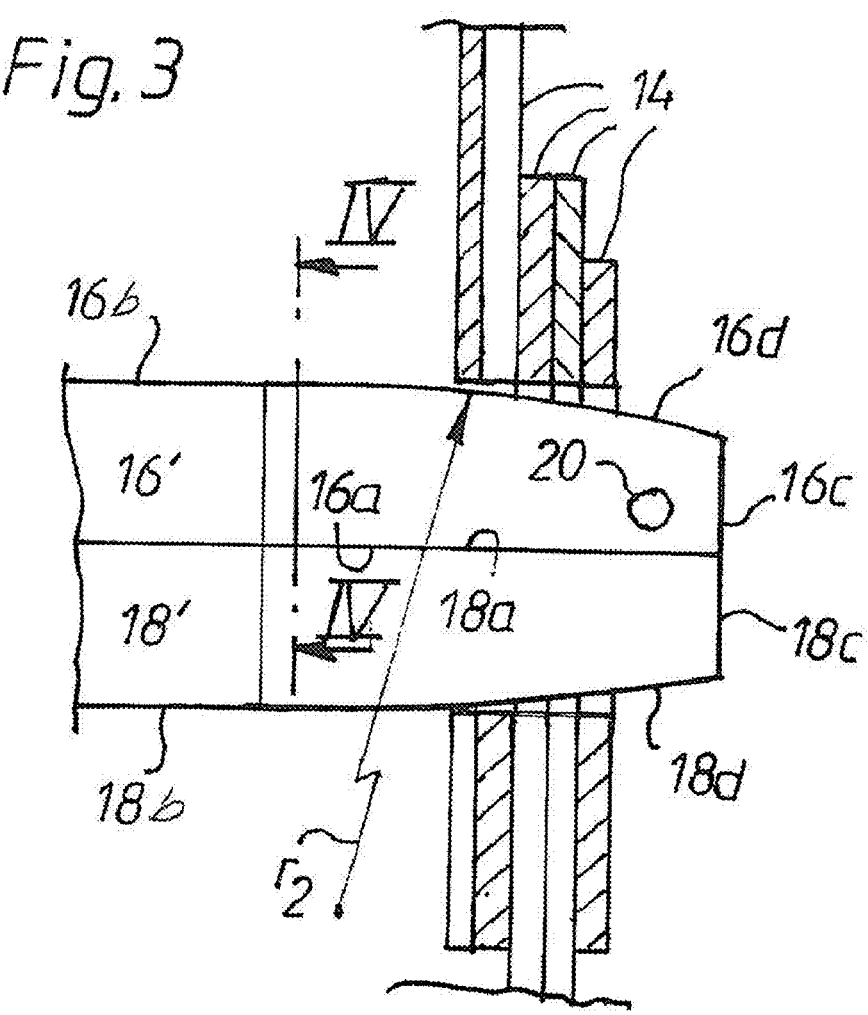
FIG. 3 shows a partial lengthwise section through one alternative cradle thrust piece pair of a link-plate chain as shown in FIG. 1, with cradle pieces which taper conically only in the end areas.
Figure 4:
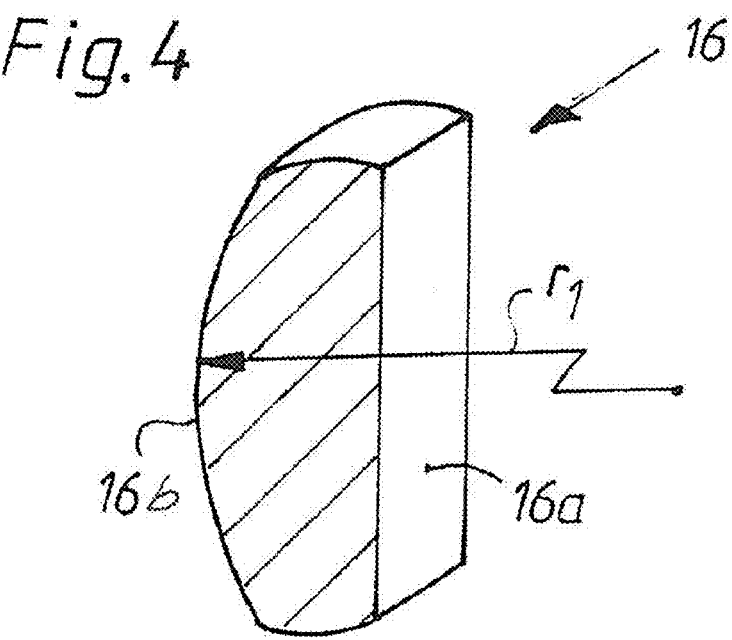
FIG. 4 shows a cross section along line IV-IV of FIG. 3 through one of the cradle pieces of the link-plate chain as shown in FIGS. 1 and 3.

The cradle thrust piece pairs 16, 18 and the cradle thrust pieces 16, 18 adjoin another on inner rolling surfaces 16a, 18a which face each other (compare also FIGS. 3 and 4), these rolling surfaces 16a, 18a running axially parallel to each other, so that depending on their geometry (plane or slightly convex) there is line or surface contact formed over the width of the link-plate chain 10 and over the length of the cradle thrust pieces 16, 18.

In contrast, the outer rolling surfaces 16b, 18b corresponding to the openings in the links 14 viewed in cross section (FIG. 4) are made convex with a defined radius r, and in a top view (FIG. 2) with a width which decreases from the middle to the outside (that is to say, conically) in a radius of curvature $r_2$, altogether a slightly crowned configuration of the rolling surfaces 16b, 18b resulting. It goes without saying that the radius of curvature $r_2$ is shown exaggerated to illustrate the invention.

Accordingly the thickness of the cradle thrust pieces 16, 18 decreases from their middle to the outside to the front surfaces 16c, 18c of the cradle thrust piece pairs 16, 18, while the links 14 with their openings 14a are made with the same geometry and effective link length.

This results in less pretensioning or loading of the links 14 which are the outer ones viewed over the width of the link-plate chain 10, because the areas of the rolling surfaces 16b, 18b which have been set back relative to an axially parallel configuration under low chain loading do not transmit or transmit only a small torque to the links 14. The outer rolling surfaces 16b, 18b of all cradle thrust pieces 16, 18 are therefore made such that the links 14 of the link-plate chain 10 which are to the outside viewed in the transverse direction are relieved at low load and at full load are also loaded in the elastic deformation area of the cradle thrust pieces 16, 18.

If for example a high driving torque is delivered into the link-plate chain 10 by way of the front surfaces 16c, 18c of the cradle thrust piece pairs 16, 18, the cradle thrust pieces 16, 18 deform in the pulling or pushing direction in the elastic range such that the outer links 14 are pulled up to uniform loading of all links 14. The rolling surfaces 16b or 18b of the cradle thrust pieces 16 or 18 transmitting at the time assume an essentially axially parallel shape over their width. For a decreasing driving torque the cradle thrust pieces 16, 18 "spring" back into their geometrically given original shape.

Instead of a continuously conical configuration of the cradle thrust pieces 16, 18 with a radius curvature $r_2$, also only the end areas of the cradle thrust pieces 16', 18' can decrease in their thickness over approximately one third of their respective length or can be provided with rolling surfaces 16d, 18d which have a segment of curvature $r_2$ (FIG. 3), while the middle section viewed in cross section is made convex, but axially parallel in the lengthwise direction, that is to say, with a uniform thickness. Thus, for lower loading of the link-plate chain 10 a defined, middle link assembly 14 is loaded, while the outer links 14 are relieved, as described.

Instead of the indicated radius of curvature $r_2$ there can also be a profiled surface with several curvatures of radii or other shapes which pass into each other.

The invention claimed is:

1. A chain for a v-shaped variable transmission pulley, comprising:
    a plurality of pairs of longitudinally spaced, transversely disposed cradle thrust members; and
    a plurality of longitudinally disposed, transversely spaced links interconnecting said pairs of members,
    wherein each of said members in an unloaded condition includes an elongated, planar surface disposed coextensively with and abutting a similar planar surface of a paired member, and at least one of said members includes a surface curved transversely with a first radius of curvature, each end portion thereof curved longitudinally with a second radius of curvature, providing a tapered end portion spaced from said links under unloaded conditions and elastically deformable and engageable with said links under load conditions.

2. A chain according to claim 1 wherein said second radius of curvature is greater than said first radius of curvature.

3. A chain according to claim 1 wherein said second-mentioned surface extends from the center of said member to each end thereof.

4. A chain according to claim 3 wherein said second radius of curvature is greater than said first radius of curvature.

5. A chain according to claim 1 wherein each of said paired members includes a surface curved transversely with a first radius of curvature, and at least each end portion thereof curved longitudinally with a second radius curvature.

6. A chain according to claim 1, wherein the elongated planar surface abuts along the similar planar surface of the paired member.

7. A chain according to claim 1, wherein the elongated planar surface abuts along the entire similar planar surface of the paired member.

8. A chain for transmitting torque between a pair of v-shaped pulleys, comprising:
    a plurality of longitudinally disposed, transversely spaced, interleaved links; and
    a plurality of transversely disposed, longitudinally spaced pins, each extending through aligned openings in said links to form a loop,
    wherein each of said pins includes a pair of coextensive members, at least one of which pins includes an elastically deformable portion projecting into an opening of a link, spaced from said link under unloaded conditions and engageable with said link under loaded conditions wherein the said members include coextensive, planar interengaging surfaces.

9. A chain according to claim 8 wherein said portion is tapered.

10. A chain according to claim 9 wherein said portion extends from a point between a midpoint and an end of said member.

11. A chain according to claim 9 wherein said portion is curved longitudinally and transversally.

12. A chain assembly according to claim 9 wherein said link is spaced laterally of a midpoint of said chain.

13. A chain according to claim 9 wherein said link is disposed at a lateral end of said chain.

14. A chain according to claim 9 wherein said portion projects through at least two aligned openings of said links.

15. A chain according to claim 14 wherein said portion has a tapered configuration.

16. A chain according to claim 14 wherein said portion functions upon increasing load conditions to successively engage said links.

17. A chain according to claim 16 wherein said portion has a tapered configuration.

* * * * *